A. F. Jaloureau,
Making Water Pipes.
No. 1,408.
Reissued Feb. 10, 1863.
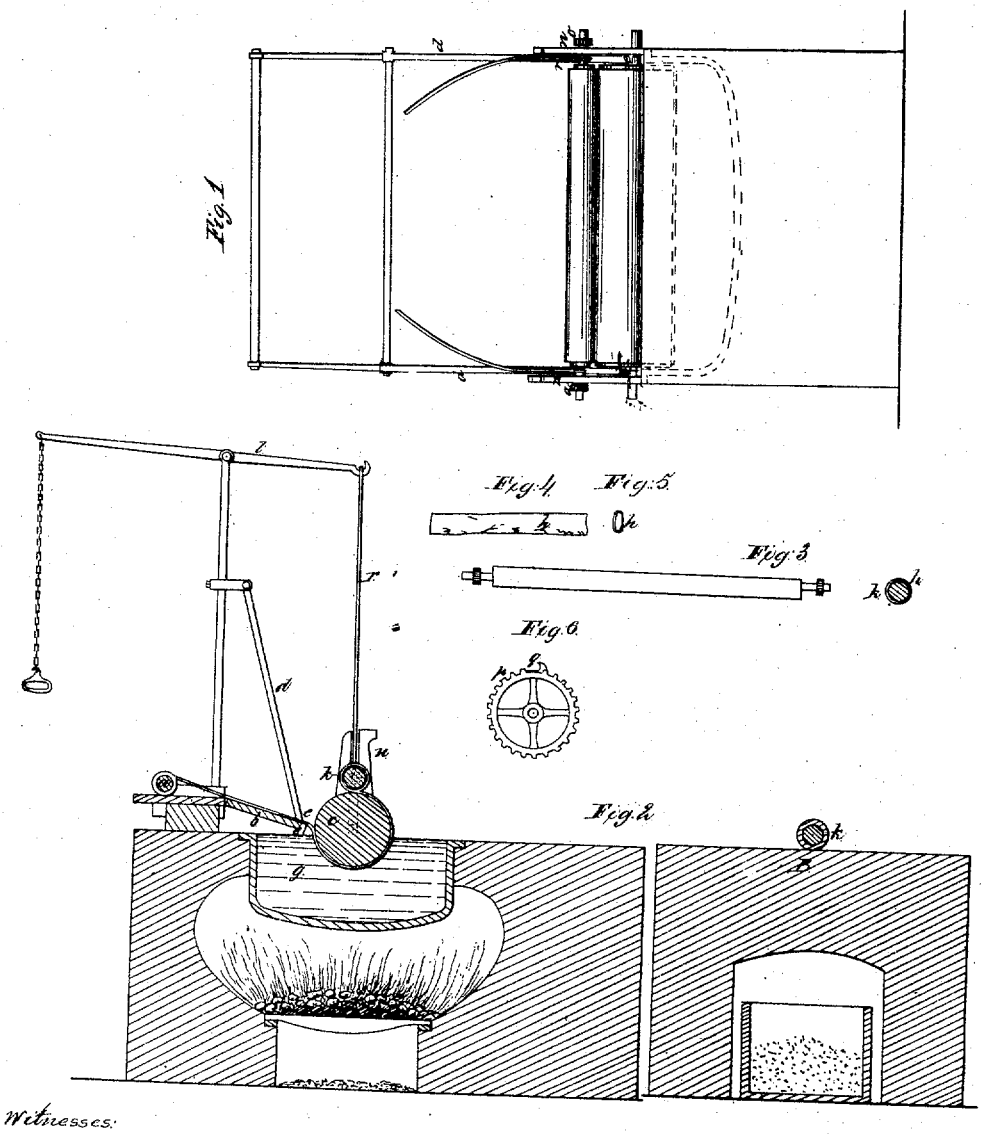
Witnesses:
Jas. Shelton
John Ayres
C. C. Griffin
Inventors:
Wm. Wood
Philo S. Shelton

UNITED STATES PATENT OFFICE.

THURLOW WEED AND PHILO S. SHELTON, OF ALBANY, NEW YORK, ASSIGNEES OF ALFRED FAUVIN JALOUREAU, OF FRANCE.

IMPROVED MACHINERY FOR THE MANUFACTURE OF BITUMINOUS-CEMENT PIPES.

Specification forming part of Letters Patent No. 24,125, dated May 24, 1859; antedated December 30, 1857; Reissue No. 1,408, dated February 10, 1863.

*To all whom it may concern:*

Be it known that ALFRED FAUVIN JALOUREAU, of Paris, in the Empire of France, has invented certain new and useful Machinery for the Manufacture of Pipes or Tubes Impervious to Water and Air, of which the following is a full, clear, and exact description, reference being had to the accompanying drawings, making part of this specification, in which—

Figure 1 is a front elevation, and Fig. 2 a vertical section. The other figures will be referred to and explained hereinafter.

The said invention relates to certain improvements in machinery for working the process of making pipes or tubes of paper or other tissue rolled up with mastic interposed between and uniting the several thicknesses or windings and for coating the outer surface of the pipes or tubes with mastic after they have been formed.

The process for the working of which the said machinery was invented consists in rolling paper or other tissue to obtain the required thickness of pipe or tube onto a mandrel as it (the paper or other tissue) is drawn through liquid bituminous or other equivalent mastic, so that the several thicknesses or windings of paper or other tissue shall be united by the interposed mastic; and the said process also consists in coating the outer surface of such pipes or tubes by causing such outer surface to roll in contact with a surface covered with liquid, or, rather, semi-liquid, mastic.

In the accompanying drawings, *a* represents a roller on which the paper or cloth or other fibrous tissue to be used in forming pipes is rolled up. This roller is held in any suitable manner in front of an inclined table, *b*, leading to a kettle, *g*, containing the mastic, which during the operation is to be kept in a liquid state by a fire in a suitable furnace below. The mastic to be used by preference is what is well known in the arts as bituminous mastic prepared from coal-tar or asphaltum, but other equivalent mastic or cement may be used. A cylinder, *c*, with the journals of its shaft mounted in two standards, *n n*, is so placed that when rotated the lower part of its periphery runs in the liquid mastic; and just over this cylinder and resting on its periphery is a cylindrical mandrel, *k*, by preference made of metal, and having its journals fitted to turn and slide up and down in slots in the standards *n n*. One end of the sheet of paper or other tissue is drawn off from the roller *a* and down the inclined table *b*, and applied to the periphery of the cylinder *c*, to which it will stick by reason of the coating of mastic on it. The cylinder is then rotated, by which the sheet of paper or other tissue is drawn through the liquid mastic to be coated by it, and passing up in its circuit it reaches the mandrel *k*, resting by its weight on the cylinder, and is carried between the two. An attendant must then strip the end of the sheet from the periphery of the cylinder *c* and press its coated surface to the periphery of the mandrel, to which it will in turn adhere by reason of having its surface coated with mastic. The cylinder and mandrel continue to be rotated, by which the sheet of paper or other tissue is regularly drawn from the roller *a*, coated with mastic, and wound up on the mandrel with liquid mastic interposed between the several windings until the required thickness is obtained. As the sheet of paper or other tissue is carried up by the rotation of the cylinder from the mastic in the kettle to the rotating mandrel above to be wound up the surplus mastic runs off and falls back into the kettle, and if the coating of mastic thus applied is found to be too thick it can be reduced by increasing the pressure of the mandrel *k*, which will have the effect of squeezing out the surplus mastic. The weight of the mandrel as a general rule is sufficient to press the successive winds onto the preceding windings to insure adhesion; but when more is required the pressure may be increased by any of the known modes of increasing the pressure of a roller, such as weighted or spring levers bearing on the journals. It is preferred to give the winding motion by applying power by a crank applied to the shaft of the mandrel, as that will give tension to the sheet of paper or other tissue, and insure tight windings; but, if desired, the power may be applied to the shaft of the cylinder *c*, or to both. During the winding care should be taken to prevent the sheet from getting out of line, which is accomplished by means of a horizontal guide-bar, *e*, suspended by two rods, *d d*, from a standard to which they are hinged, as represented. To prevent the pipe thus to be formed from being cemented to the mandrel by the mastic a cylindrical sleeve, *h* (see Figs 3, 4, and 5,) made of paper, is slipped onto the mandrel, which is previously greased or otherwise lubricated; and to facilitate the putting on of this sleeve a cone may be used on the end of the mandrel, as in the well-known mode of putting a cylindrical wick on the wick-holder of a lamp. If the length of paper or other tissue on the roller *a* is greater than required for the making of one pipe, the sheet is to be cut off on the table B when the required thickness of pipe has been obtained. It is desirable in making such pipes to put one or more coats of mastic on the outside after the winding has been completed; but it is desirable that such coating or coatings should be of uniform thickess on any desired number of pipes, and to secure this result the mastic is carried up from the kettle *g* by the periphery of the cylinder *c* and transferred to the periphery of the formed pipe resting and rolling on it; and as the mandrel and the formed pipe on it bear on the cylinder by a given weight, and that weight will squeeze out from between the surfaces all above a given thickness of mastic at any period of contact by giving to the mandrel a determined number of revolutions, the required thickness of coating will be determined. To effect this result the shaft of the mandrel is provided with a pinion, *o*, (see Fig. 3,) which engages a cog-wheel, *p*, on the shaft of the cylinder. (Represented separately in Fig. 6.) The cogs are omitted on a segment of the wheel *p*, and in the rotation, when this open segment reaches the pinion, a hook, *q*, on the wheel *p* comes in contact with the shaft of the mandrel and acts as a stop to prevent the further revolution of the cylinder. Either or both of these modes of stopping may be used. After the first coating has been put on the mandrel is to be lifted off and transferred to the table B by the side of the machine, which is done by two rods, *r r*, suspended from one end of a lever, *l*. The rods are hooked at their lower ends to take hold of the shaft of the mandrel. The mandrel, after it has been transferred to the table B, is to be rolled back and forth on the surface of this table, which is to be covered with sand or other earthy granular matter, which by the rolling becomes embedded in the coating of mastic. The table B may be made of stone, or brick, or any other suitable material, properly smoothed, and maintained at a gentle heat by a fire below. After one coat has been thus rolled, a second coat, if desired, may be put on the same. After the mastic has become sufficiently set the mandrel can be taken out by standing it on end and giving it a slight knock. As it takes a considerable time for the mastic to become thoroughly dry and hard, wooden mandrels of the same size should be provided to insert in each pipe when the metal mandrel is taken out, so as to prevent the pipes from getting out of shape while the mastic is solidifying. Afterward, if desired, the inner paper sleeve may be readily removed by a metallic brush or scraper and the inside of the pipe coated by simply running liquid mastic or cement through it.

What is claimed as the invention of the said ALFRED FAUVIN JALOUREAU in machinery for making pipes of paper or other tissue and liquid mastic or cement is—

1. The mandrel on which the pipe is formed by winding, in combination with the kettle or other vessel containing the liquid mastic or cement, and the cylinder on which the mandrel rolls, and which carries the paper or other tissue through the liquid mastic or cement and up to the mandrel, substantially as and for the purpose specified.

2. The rotating mandrel and cylinder on which it rolls, in combination with the movable sleeve put on the mandrel, substantially as described, and for the purpose of preventing the pipes, when formed, from adhering to the mandrel.

3. The combination of the rotating mandrel, the cylinder on which the mandrel rotates, the kettle or other vessel for containing the liquid mastic or cement, and the guide or equivalent means for guiding the sheet of paper or other tissue, substantially as described.

THURLOW WEED.
PHILO S. SHELTON.

Witnesses as to Thurlow Weed:
B. W. GRISWOLD,
SAML. BLATCHFORD.

Witnesses as to Philo S. Shelton:
JOHN AYRES,
C. E. BUFFUM.